US009680672B2

(12) United States Patent
Hajati et al.

(10) Patent No.: US 9,680,672 B2
(45) Date of Patent: Jun. 13, 2017

(54) HAPTIC ACTUATOR INCLUDING PULSE WIDTH MODULATED WAVEFORM BASED COIL MOVEMENT AND RELATED METHODS

(71) Applicant: Apple Inc., Cupertino, CA (US)

(72) Inventors: Arman Hajati, Cupertino, CA (US); Shingo Yoneoka, Cupertino, CA (US); Jonah A. Harley, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 92 days.

(21) Appl. No.: 14/858,782

(22) Filed: Sep. 18, 2015

(65) Prior Publication Data

US 2017/0085402 A1 Mar. 23, 2017

(51) Int. Cl.
*H04B 3/36* (2006.01)
*H04L 25/49* (2006.01)
*G06F 3/01* (2006.01)
*G08B 6/00* (2006.01)

(52) U.S. Cl.
CPC .......... *H04L 25/4902* (2013.01); *G06F 3/016* (2013.01); *G08B 6/00* (2013.01)

(58) Field of Classification Search
CPC ............... G06F 3/016; G06F 2203/014; G06F 2203/013; G06F 3/011; G08B 6/00; H04L 67/38; H04L 25/4902
USPC .......................................... 340/407.1, 407.2
See application file for complete search history.

(56) References Cited

U.S. PATENT DOCUMENTS

| 8,169,402 B2 | 5/2012 | Shahoian et al. |
| 2006/0119573 A1* | 6/2006 | Grant .................. G06F 3/016 345/156 |
| 2007/0035526 A1* | 2/2007 | Takenaka .............. G06F 3/016 345/173 |
| 2011/0018390 A1* | 1/2011 | Guidarelli ............ H02N 2/0015 310/317 |
| 2012/0025742 A1* | 2/2012 | Masahiko ............. B06B 1/0207 318/114 |
| 2013/0002411 A1* | 1/2013 | Henderson ............ H02N 2/005 340/407.1 |

(Continued)

FOREIGN PATENT DOCUMENTS

WO 2013169299 A1 11/2013
WO 2013169303 A1 11/2013

(Continued)

OTHER PUBLICATIONS

Product Specification Sheet: GEEPLUS, VIBRO1 Vibration Actuator, 2 pages, www.geeplus.biz, downloaded on Jul. 15, 2015.
Hajati, Arman, U.S. Appl. No. 14/858,794, filed Sep. 18, 2015.

*Primary Examiner* — Eric M Blount
(74) *Attorney, Agent, or Firm* — Allen, Dyer, Doppelt & Gilchrist, P.A.

(57) ABSTRACT

A haptic actuator may include a housing, at least one permanent magnet carried by the housing, a field member movable within the housing and comprising at least one coil cooperating with the at least one permanent magnet, and at least one mechanical limit stop between the housing and the field member. The haptic actuator may also include circuitry capable of generating a pulse width modulated (PWM) waveform for the at least one coil to move the field member from an initial at-rest position and without contacting the at least one mechanical limit stop.

26 Claims, 6 Drawing Sheets

(56) References Cited

U.S. PATENT DOCUMENTS

| | | | |
|---|---|---|---|
| 2013/0342330 A1* | 12/2013 | Kiefer | G08B 6/00 340/407.1 |
| 2014/0197936 A1 | 7/2014 | Biggs et al. | |
| 2015/0109223 A1 | 4/2015 | Kessler et al. | |
| 2015/0116205 A1 | 4/2015 | Westerman et al. | |
| 2015/0130730 A1 | 5/2015 | Harley et al. | |
| 2016/0258758 A1* | 9/2016 | Houston | G01C 21/20 |

FOREIGN PATENT DOCUMENTS

| | | | |
|---|---|---|---|
| WO | 2013169305 A1 | 11/2013 | |
| WO | 2013170099 A1 | 11/2013 | |
| WO | 2013188307 A2 | 12/2013 | |
| WO | 2014018111 A1 | 1/2014 | |
| WO | 2015020663 A1 | 2/2015 | |

* cited by examiner

HAPTIC ACTUATOR INCLUDING PULSE WIDTH MODULATED WAVEFORM BASED COIL MOVEMENT AND RELATED METHODS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A haptic actuator may include a housing, at least one permanent magnet carried by the housing, and a field member movable within the housing and that includes at least one coil cooperating with the at least one permanent magnet. The haptic actuator may also include at least one mechanical limit stop between the housing and the field member and circuitry capable of generating a pulse width modulated (PWM) waveform for the at least one coil to move the field member from an initial at-rest position and without contacting the at least one mechanical limit stop. Accordingly, the field member may move, for example, from an initial at-rest position to a steady state operation, without contacting the mechanical limit stop.

The PWM waveform may have a pulse width that decreases over time for a number of pulses. The PWM waveform may have a constant pulse width after the number of pulses, for example.

The PWM waveform may have a decreasing amplitude for a number of pulses. The PWM waveform may have a constant amplitude after the number of pulses, for example.

The PWM waveform may be a bipolar waveform, for example. The PWM waveform may have a constant repetition rate. The housing, at least one permanent magnet, and field member may define a resonant frequency, and the repetition rate may be at an integer multiple of the resonant frequency, for example.

The circuitry may include an intermediate waveform generator capable of generating a bipolar square wave and a low pass filter coupled to the intermediate waveform generator. The intermediate waveform generator may be capable of generating an intermediate waveform based upon an exponential function, for example.

An electronic device aspect is directed to an electronic device that may include a device housing and wireless communications circuitry carried by the device housing. The electronic device may also include a haptic actuator carried by the device housing. The haptic actuator may include an actuator housing, at least one permanent magnet carried by the actuator housing, and a field member movable within the actuator housing that includes at least one coil cooperating with the at least one permanent magnet. The haptic actuator may also include at least one mechanical limit stop between the actuator housing and the field member, and circuitry capable of generating a pulse width modulated (PWM) waveform for the at least one coil to move the field member from an initial at-rest position and without contacting the at least one mechanical limit stop. The electronic device may also include a controller coupled to the wireless communications circuitry and the haptic actuator, and capable of performing at least one wireless communication function and selectively operating the haptic actuator.

A method aspect is directed to a method of operating a haptic actuator that may include a housing, at least one permanent magnet carried by the housing, a field member movable within the housing and that includes at least one coil cooperating with the at least one permanent magnet, and at least one mechanical limit stop between the housing and the field member. The method may include using circuitry to generate a pulse width modulated (PWM) waveform for the at least one coil to move the field member from an initial at-rest position and without contacting the at least one mechanical limit stop.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation is used to describe like elements in different embodiments.

Figure 1:
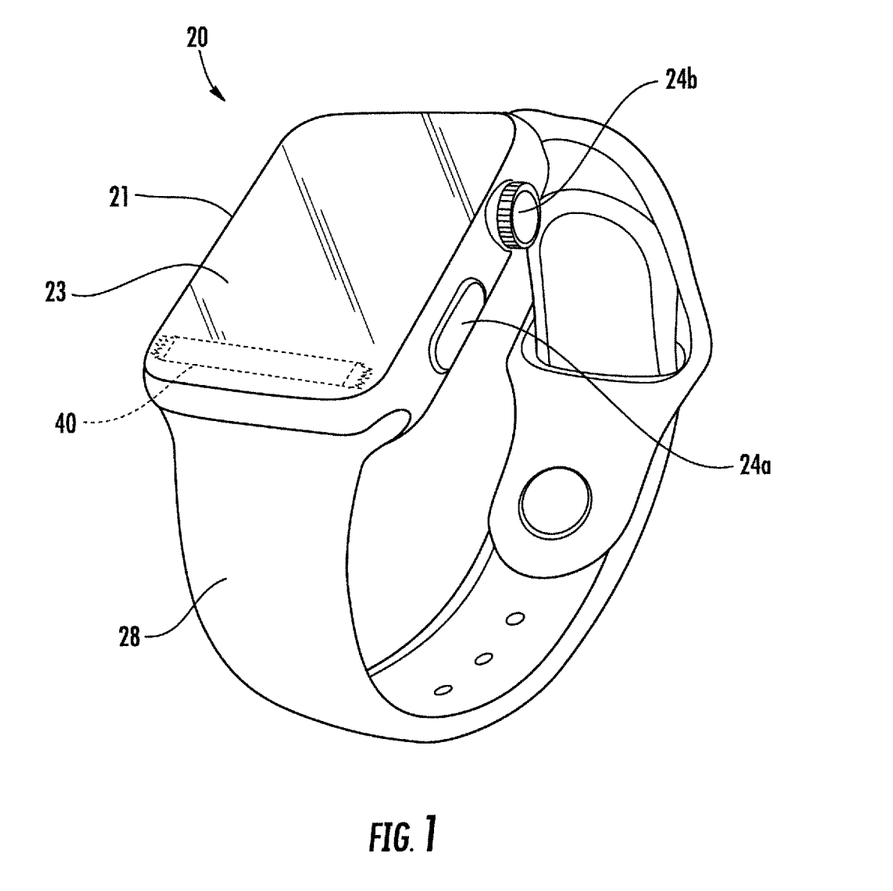
FIG. 1 is a perspective view of an electronic device including a haptic actuator according to an embodiment of the present invention.
Figure 2:
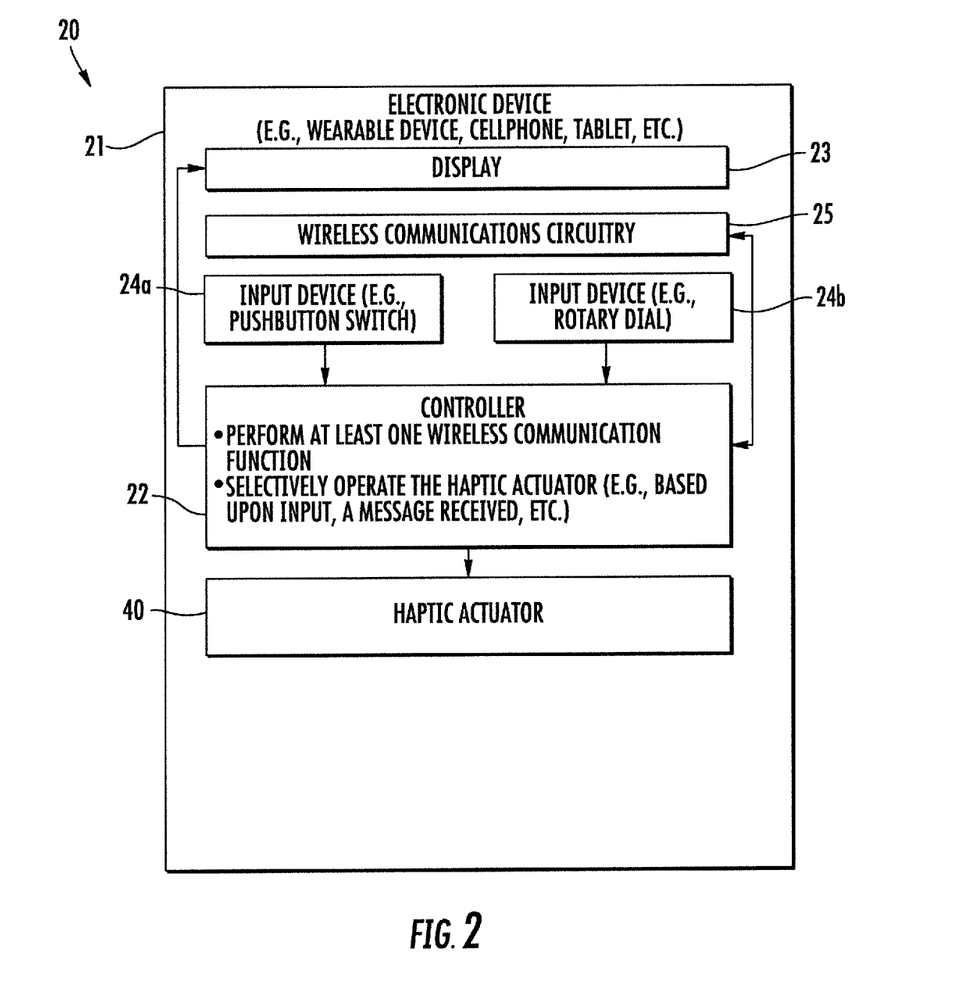
FIG. 2 is a schematic block diagram of the electronic device of FIG. 1.

Referring initially to FIGS. 1 and 2, an electronic device 20 illustratively includes a device housing 21 and a controller 22 carried by the device housing. The electronic device 20 is illustratively a mobile wireless communications device, for example, a wearable wireless communications device, and includes a band 28 or strap for securing it to a user. The electronic device 20 may be another type of electronic device, for example, a cellular telephone, a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be a liquid crystal display (LCD), for example, or may be another type of display, as will be appreciated by those skilled in the art.

Finger-operated user input devices 24a, 24b, illustratively in the form of a pushbutton switch and a rotary dial are also carried by the device housing 21 and is coupled to the controller 22. The pushbutton switch 24a and the rotary dial 24b cooperate with the controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the controller 22 and provides haptic feedback to the user in the form of relatively long and short vibrations or "taps", particularly when the user is wearing the electronic device 20. The vibrations may be indicative of a message received, and the duration of the vibration may be indicative of the type of message received. Of course, the vibrations may be indicative of or convey other types of information. More particularly, Electronic the controller 22 applies a voltage to move a moveable body or masses between first and second positions.

While a controller 22 is described, it should be understood that the controller 22 may include one or more of a processor and other circuitry to perform the functions described herein.

Figure 3:
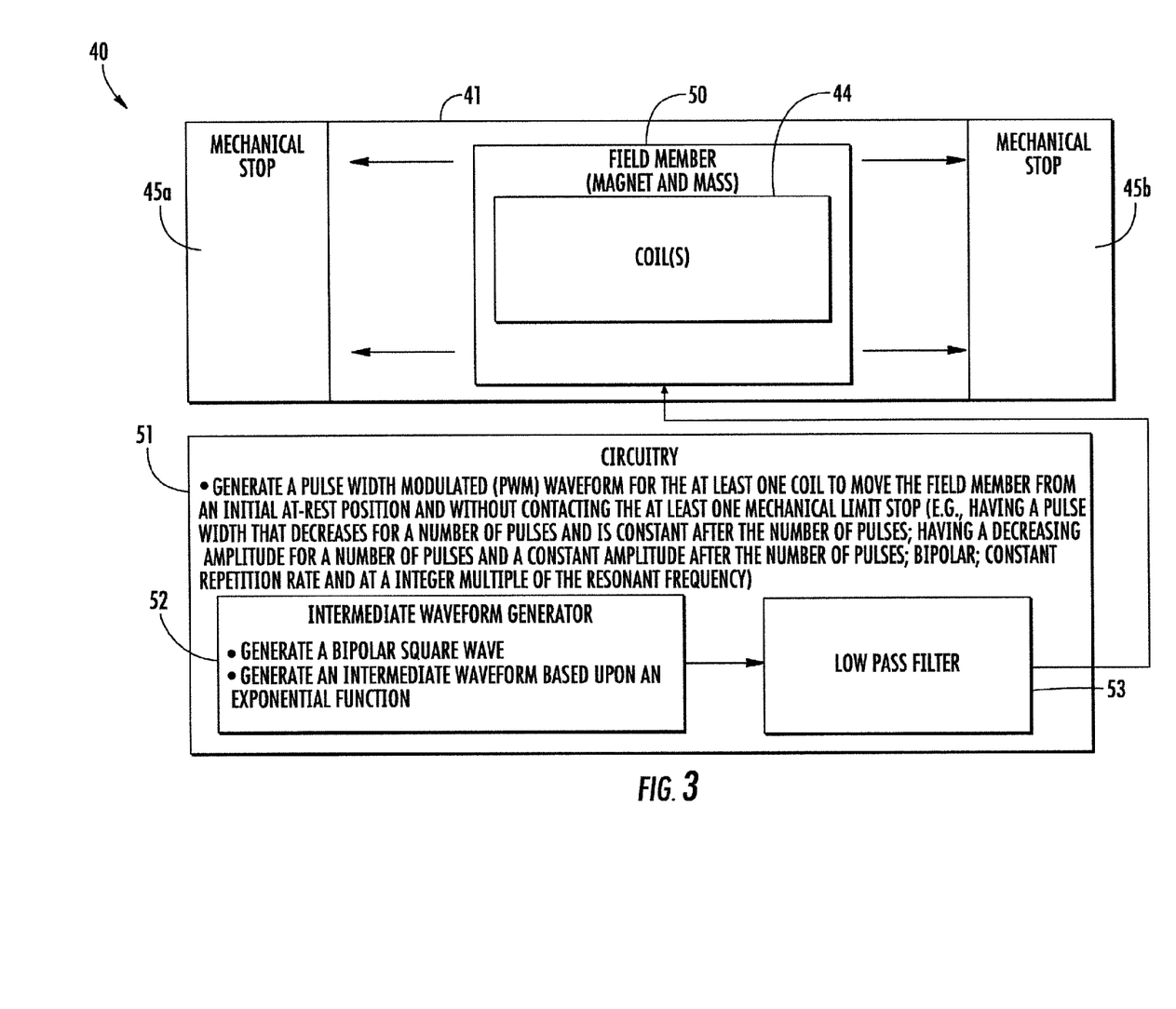
FIG. 3 is a more detailed schematic diagram of the haptic actuator of FIG. 1.

Referring now additionally to FIG. 3, the haptic actuator 40 includes a housing 41 and a coil 44 carried by the housing. Of course, there may be more than one coil carried by the housing 41.

A field member 50 is movable within the housing 41 responsive the coil 44. The movement of the field member 50 creates the haptic feedback, or tapping, as will be appreciated by those skilled in the art. While the movement of the field member 50 may be described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 50 may include one or more masses and may be shaped for a particular application or operation. The field member 50 may also include one or more permanent magnets cooperating with the coil 44 to provide movement of the field member. The field member 50 may also include a suspension system that may include one or more springs for maintaining the field member suspended in the housing 41. The springs may include mechanical springs, such as, for example, coil springs, leaf springs, and flexures. The springs may also or additionally include magnetic springs that, through interaction with the permanent magnets and/or ferritic parts of the housing 41, if any, store and amplify the energy in the form of elastic/magnetic energy. In addition, the suspension system, for example, through shafts, linear/angular bearings, sliding bearings, flexures, multi-bar linkage mechanisms, and springs, may enable motion of the field member 50 in the desired direction (e.g. X axis in a linear actuator or around a certain axis in an angular actuator) while constraining motion in other degrees of freedom. The suspension system may include other and/or additional components for maintaining the suspension of the field member 50 as well as constrain movement of the field member.

The haptic actuator 40 also includes mechanical limit stops 45a, 45b between the housing 41 and the field member 50. The mechanical limit stops 45a, 45b limit the movement of the field member to a desired range and/or stop the field member from crashing or banging into the housing 41. While mechanical stops 45a, 45b are described, it will be appreciated that the mechanical stops may be part of or a portion of the housing 41.

Typically, circuitry generates a sinusoidal drive waveform that drives the field member to move from an initial at-rest position. However, as will be appreciated by those skilled in the art, in a stationary or at-rest position, the field member 50 has a static friction associated with it which may cause the field member to "get stuck" despite the application of a drive voltage. A certain amount of force or voltage is thus needed to overcome this static friction force to cause the field member 50 to move. One approach to drive the field member 50 from the at-rest position is to increase the drive voltage or amplitude of the sinusoidal drive waveform. However, once the static friction force is overcome, the field member 50 typically rapidly accelerates and crashes or bangs into the mechanical limit stops 45a, 45b.

In some applications it may be particularly desirable to not have the field member 50 hit or bang into the mechanical limit stops 45a, 45b as this may generate a corresponding "banging" noise. To reduce the amount of noise, for example, caused by the increased amplitude, the haptic actuator 40 includes circuitry 51 that generates a pulse width modulated (PWM) waveform for the coil 44 to move the field member 50 without contacting the mechanical limit stops 45a, 45b.

Figure 4:
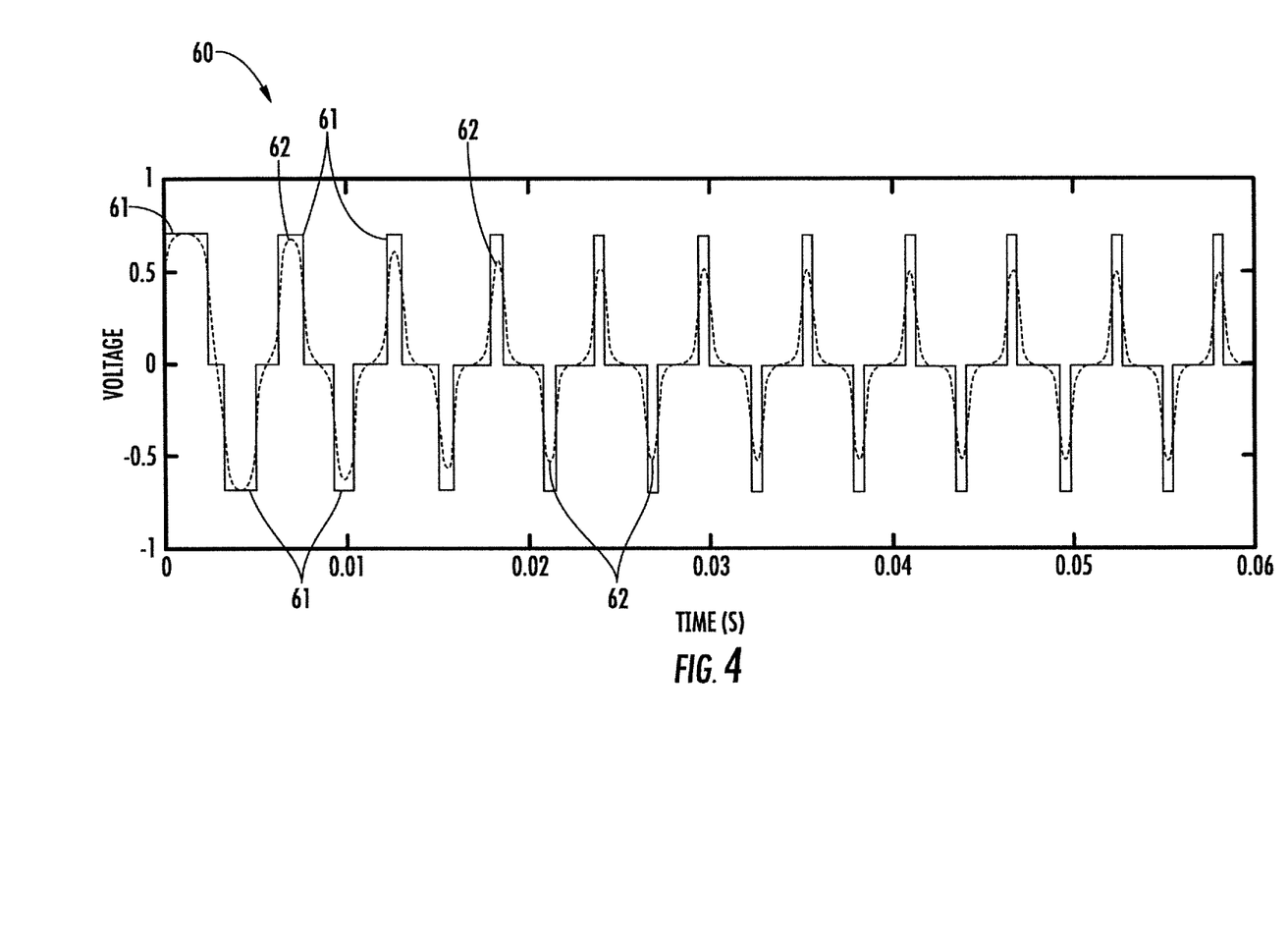
FIG. 4 is a graph of waveforms generated by the circuitry of the haptic actuator of FIG. 3.

Referring now additionally to the graph 60 in FIG. 4, instead of using a sinusoidal waveform to drive the field member 50, the circuitry 51 generates a PWM waveform based upon a sinusoidal input waveform. The PWM waveform is generated to have certain characteristics that may be particularly beneficial to the "sticking" of the field member 50 described above.

In particular, the circuitry 51 generates a bipolar PWM waveform to have a pulse width that decreases over time for a number of pulses and has a constant pulse width after the number of pulses. The number of pulses may be any number of pulses and may be based upon desired operating characteristics, for example, duration and/or type of the haptic feedback, and/or mechanical characteristics of the haptic actuator 40. As will be appreciated by those skilled in the art, the adaptive duty cycle may be more robust with respect to "sticky" haptic actuators, for example, haptic actuators having a relatively high Q-factor value.

The circuitry 51 also generates the PWM waveform at a constant repetition rate or frequency. As will be appreciated by those skilled in the art, the actuator housing 41, the coil 44, and field member 50 define a resonant frequency. The constant repetition rate may be an integer multiple of the resonant frequency, for example, to provide increased field member movement for a reduced amount of energy.

The circuitry 51 includes an intermediate waveform generator 52 that generates a bipolar square wave 61. The bipolar square wave 61 has the PWM waveform characteristics described above. The circuitry 51 also includes a low pass filter 53 coupled to the intermediate waveform generator 52. The low pass filter 53 may be desirable to reduce the relatively sharp edges of the bipolar square wave 61. The low pass filter 53 may be a double-sided low pass filter, for example, 500 Hz-1 kHz.

The low pass filtered bipolar square wave is illustrated by the line 62 and may be referred to as the drive PWM waveform. Illustratively, the circuitry 51 generates the drive PWM waveform 62 to have a decreasing amplitude for a number of pulses and a constant amplitude after the number of pulses. The number of pulses may be any number of pulses and may be based upon desired operating characteristics, for example, duration and/or type of the haptic feedback, and/or mechanical characteristics of the haptic actuator. As will be appreciated by those skilled in the art, the amplitude may be constant after the number of pulses as the haptic actuator, or more particularly, the field member 50 may be at a steady state. Thus, just enough energy or amplitude may be used to maintain the steady state operation.

The threshold or number of pulses that are decreasing in amplitude before generating constant amplitude pulses may be determined based upon an exponential function, for example to reduce the chances of or to avoid an overshoot and hitting the mechanical limit stops 45a, 45b. For example, if the drive PWM waveform 62 is to be above the threshold, the circuitry 51 may use the threshold limit or constant amplitude of the intermediate waveform 62. If however, the drive PWM waveform 62 is to be below the threshold, the drive PWM waveform may have a respective amplitude (either decreasing or constant) so long as it is below the threshold.

To generate the drive PWM waveform 62 from a sinusoidal input, the circuitry 51, in some embodiments, may apply an algorithm. The algorithm may be embodied using hardware or by software, firmware, etc. loaded into a memory and executed by the circuitry. An exemplary algorithm may be coded as:

$$LPF = tf(1,[1/2*pi*750) \; 1]);$$

$$W = V\_Vibe*sign(sin(2pi*f0*T)).*(abs(sin(2*pi*f0*T)) > (0.95-exp(-2*pi*f0*T/5)));\; and$$

$$WF = (lsim(LPF,W,T) + flip(lsim(LPF,flip(W),T)))/2$$

wherein LPF is the function for determining the parameters of the low pass filter. The "750" is the LPF frequency in this example. The term "(0.95−exp(−2*pi*f0*T/5))" determines how fast the circuitry 51 will generate the decreasing pulse widths to the steady state, i.e. the number of pulses and/or steady state threshold. The threshold is set by the exponential term, "0.95−exp." f0 is the frequency of operation and T is time. Those skilled in the art will recognize that other terms in the algorithm are names given to programming functions.

The drive PWM waveform 62 may be considered, relative to a typical sinusoidal input, a short duty high voltage PWM waveform smoothed by the low pass filter. As a result of the drive PWM waveform, the electromotive force is, as opposed to the typical sinusoidal input and which is based upon, and more particularly, proportional to the current, may be much larger than the friction force. Thus, the field member 50 may not "get stuck" or the static friction forces may be manageable such that the field member does not crash or bang into the mechanical limit stops 45a, 45b. Additionally, considering the relatively short duty cycle of the drive PWM waveform, the amplitude that causes the movement of the field member 50 or the vibration may be significantly reduced to a manageable and desired level.

Figure 5:
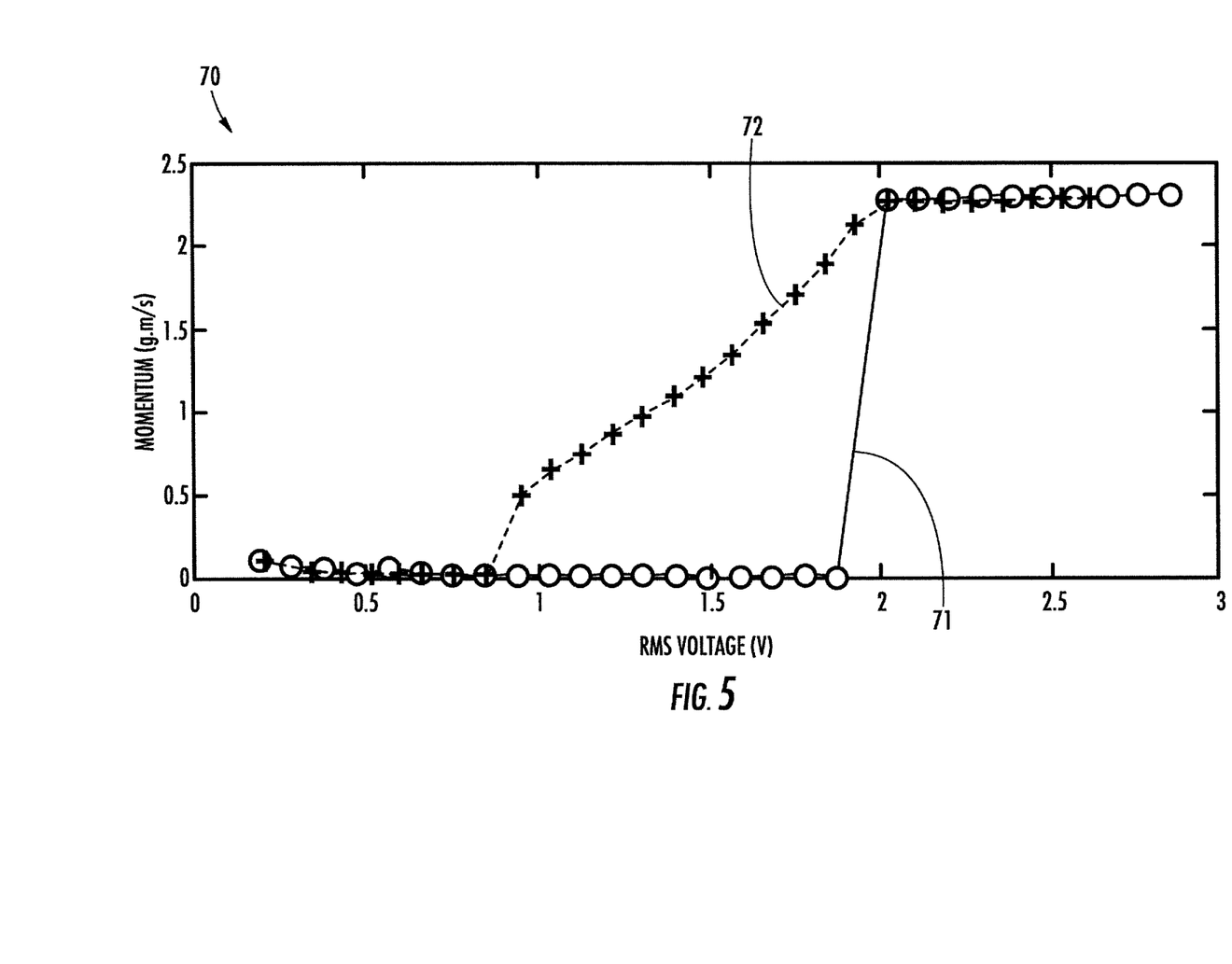
FIG. 5 is a graph illustrating momentum versus voltage for pure sinusoidal input waveform and a PWM waveform output by the circuitry of the haptic actuator of FIG. 3.

Referring now additionally to the graph 70 in FIG. 5 a purely sinusoidal waveform is illustrated by the line 71 showing momentum versus an amount of applied voltage. The drive PWM waveform generated by the circuitry 51 is illustrated by the line 72. Illustratively, the purely sinusoidal waveform 71 may be particularly undesirable as it may cause "crashing" as a result of the spike in momentum.

While both a controller 22 circuitry 51 of the haptic actuator 40 have respectively been described herein with respect to their functionality, it will be appreciated by those skilled in the art that the circuitry and the controller may be physically embodied on a single physical chip, for example.

A method aspect is directed to a method of operating a haptic actuator 40 that includes a housing 41, at least one coil 44 carried by the housing, a field member 50 movable within the housing responsive to the at least one coil, and at least one mechanical limit stop 45a, 45b between the housing and the field member. The method includes using circuitry 51 to generate a pulse width modulated (PWM) waveform for the at least one coil 44 to move the field member 50 from an initial at-rest position and without contacting the at least one mechanical limit stop 45a, 45b.

Figure 6:
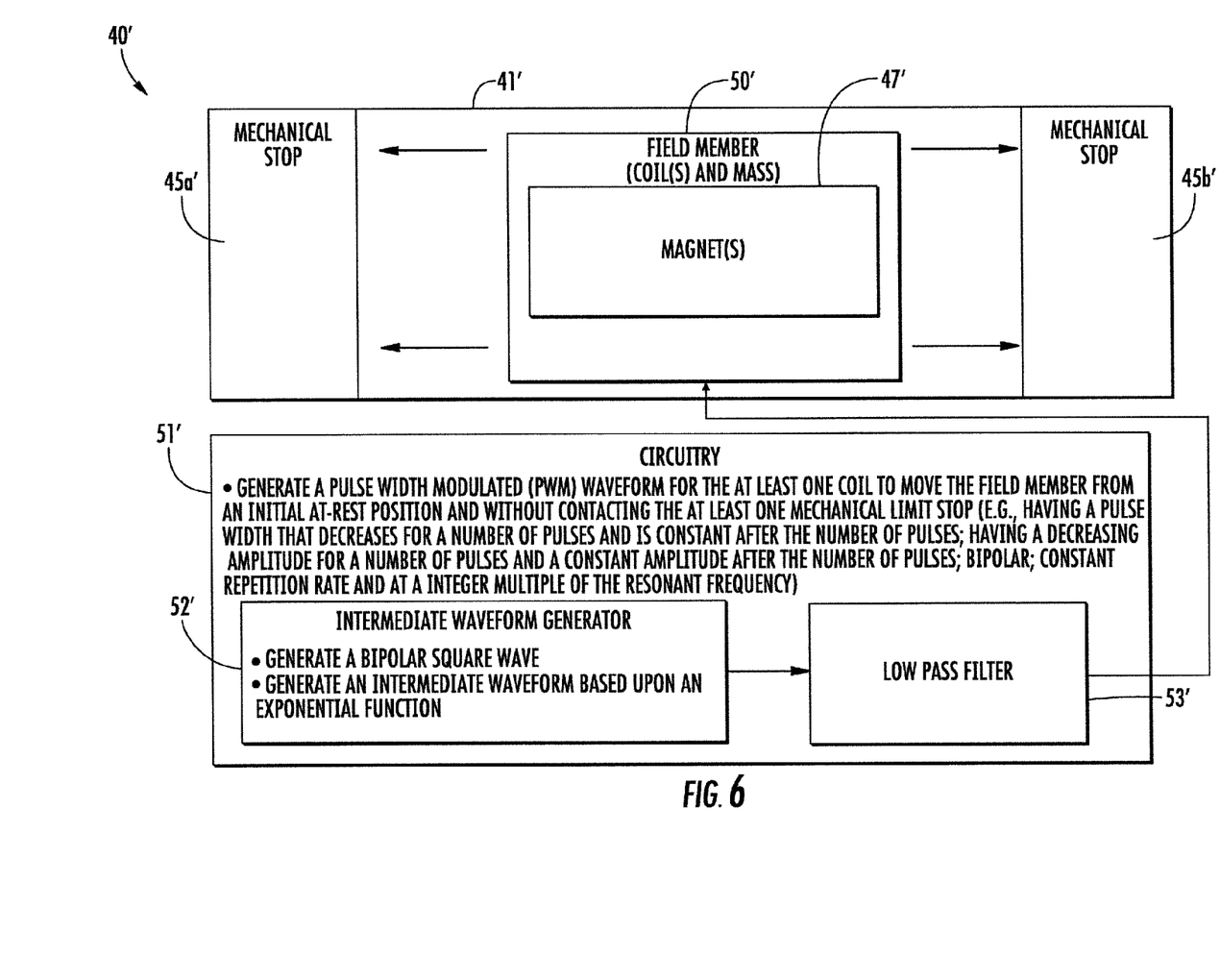
FIG. 6 is a schematic diagram of a haptic actuator according to another embodiment.

Referring now to FIG. 6, in another embodiment, the haptic actuator 40' may include a permanent magnet 47' carried by the housing 41', and the field member 50' may include one or more coils that cooperate with the permanent magnet. In other words, in contrast to the embodiment described above, the permanent magnet is stationary (i.e., carried by the housing 41') and the coils, as part of the field member 50' are moving (i.e., connected to the mass). Of course, there may be any number of coils and/or permanent magnets.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A haptic actuator comprising:
   a housing;
   at least one permanent magnet carried by the housing;
   a field member movable within the housing and comprising at least one coil cooperating with the at least one permanent magnet;
   at least one mechanical limit stop between the housing and the field member; and
   circuitry capable of generating a pulse width modulated (PWM) waveform for the at least one coil to move the field member from an initial at-rest position and without contacting the at least one mechanical limit stop.

2. The haptic actuator of claim 1 wherein the PWM waveform has a pulse width that decreases over time for a number of pulses.

3. The haptic actuator of claim 2 wherein the PWM waveform has a constant pulse width after the number of pulses.

4. The haptic actuator of claim 1 wherein the PWM waveform has a decreasing amplitude for a number of pulses.

5. The haptic actuator of claim 4 wherein the PWM waveform has a constant amplitude after the number of pulses.

6. The haptic actuator of claim 1 wherein the PWM waveform is a bipolar waveform.

7. The haptic actuator of claim 1 wherein the PWM waveform has a constant repetition rate.

8. The haptic actuator of claim 7 wherein the housing, at least one permanent magnet, and field member define a resonant frequency; and wherein the constant repetition rate is at an integer multiple of the resonant frequency.

9. The haptic actuator of claim 1 wherein the circuitry comprises:
an intermediate waveform generator capable of generating a bipolar square wave; and
a low pass filter coupled to the intermediate waveform generator.

10. The haptic actuator of claim 9 wherein the intermediate waveform generator is capable of generating an intermediate waveform based upon an exponential function.

11. An electronic device comprising:
a device housing;
wireless communications circuitry carried by the device housing;
a haptic actuator carried by the device housing and comprising
an actuator housing,
at least one permanent magnet carried by the actuator housing,
a field member movable within the actuator housing and comprising at least one coil cooperating with the at least one permanent magnet,
at least one mechanical limit stop between the actuator housing and the field member, and
circuitry capable of generating a pulse width modulated (PWM) waveform for the at least one coil to move the field member from an initial at-rest position and without contacting the at least one mechanical limit stop; and
a controller coupled to the wireless communications circuitry and the haptic actuator, and capable of performing at least one wireless communication function and selectively operating the haptic actuator.

12. The electronic device of claim 11 wherein the PWM waveform has a pulse width that decreases over time for a number of pulses.

13. The electronic device of claim 12 wherein the PWM waveform has a constant pulse width after the number of pulses.

14. The electronic device of claim 11 wherein the PWM waveform has a decreasing amplitude for a number of pulses.

15. The electronic device of claim 14 wherein the PWM waveform has a constant amplitude after the number of pulses.

16. The electronic device of claim 11 wherein the PWM waveform is a bipolar waveform.

17. The electronic device of claim 11 wherein the PWM waveform has a constant repetition rate.

18. The electronic device of claim 17 wherein the housing, at least one permanent magnet, and field member define a resonant frequency; and wherein the constant repetition rate is at an integer multiple of the resonant frequency.

19. A method of operating a haptic actuator comprising a housing, at least one permanent magnet carried by the housing, a field member movable within the housing and comprising at least one coil cooperating with the at least one permanent magnet, and at least one mechanical limit stop between the housing and the field member, the method comprising:
using circuitry to generate a pulse width modulated (PWM) waveform for the at least one coil to move the field member from an initial at-rest position and without contacting the at least one mechanical limit stop.

20. The method of claim 19 wherein the circuitry generates the PWM waveform to have a pulse width that decreases over time for a number of pulses.

21. The method of claim 20 wherein the circuitry generates the PWM waveform to have constant pulse width after the number of pulses.

22. The method of claim 19 wherein the circuitry generates the PWM waveform to have decreasing amplitude for a number of pulses.

23. The method of claim 22 wherein the circuitry generates the PWM waveform to have a constant amplitude after the number of pulses.

24. The method of claim 19 wherein the circuitry generates the PWM waveform as a bipolar waveform.

25. The method of claim 19 wherein the circuitry generates the PWM waveform to have a constant repetition rate.

26. The method of claim 25 wherein the housing, at least one permanent magnet, and field member define a resonant frequency; and wherein the constant repetition rate is at an integer multiple of the resonant frequency.

* * * * *